US009087211B2

(12) United States Patent
Eisinger et al.

(10) Patent No.: US 9,087,211 B2
(45) Date of Patent: Jul. 21, 2015

(54) METHOD AND SYSTEM FOR ANNOTATION BASED SECURE CACHING

(75) Inventors: Jacob D. Eisinger, Austin, TX (US); Sri Ramanathan, Lutz, FL (US); William A. Reichert, III, Arlington, VA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 747 days.

(21) Appl. No.: 12/272,081

(22) Filed: Nov. 17, 2008

(65) Prior Publication Data

US 2010/0125602 A1   May 20, 2010

(51) Int. Cl.
*G06F 21/00* (2013.01)
*G06F 21/62* (2013.01)
*G06F 12/08* (2006.01)

(52) U.S. Cl.
CPC ........ *G06F 21/6227* (2013.01); *G06F 12/0875* (2013.01)

(58) Field of Classification Search
CPC . G06F 21/6227; G06F 21/10; G06F 21/6218; G06F 12/0875
USPC ............................ 713/167, 160, 189; 380/210
See application file for complete search history.

(56) References Cited

U.S. PATENT DOCUMENTS

| 6,598,057 | B1 | 7/2003 | Synnestvedt et al. | |
|---|---|---|---|---|
| 6,976,090 | B2 | 12/2005 | Ben-Shaul et al. | |
| 7,082,572 | B2 | 7/2006 | Pea et al. | |
| 7,151,832 | B1 * | 12/2006 | Fetkovich et al. | ............ 380/210 |
| 7,320,008 | B1 | 1/2008 | Colgrove | |
| 7,607,126 | B2 | 10/2009 | Read | |
| 7,702,800 | B2 | 4/2010 | Copeland et al. | |
| 7,707,564 | B2 | 4/2010 | Marvin et al. | |
| 2002/0116474 | A1 | 8/2002 | Copeland et al. | |
| 2004/0064692 | A1 * | 4/2004 | Kahn et al. | ..................... 713/167 |
| 2005/0021689 | A1 | 1/2005 | Marvin et al. | |
| 2005/0262499 | A1 | 11/2005 | Read | |
| 2007/0079117 | A1 * | 4/2007 | Bhogal et al. | ................. 713/160 |

OTHER PUBLICATIONS

Banditwattanawong, T.; Maruyama, K.; Hidaka, S.; Washizaki, H., "Proxy-and-hook: a Java-based distributed object caching," Industrial Informatics, 2005. INDIN '05. 2005 3rd IEEE International Conference on , vol., No. pp. 819-824, Aug. 10-12, 2005.*

(Continued)

*Primary Examiner* — Syed Zaidi
(74) *Attorney, Agent, or Firm* — Matthew Chung; Roberts Mlotkowski Safran & Cole, P.C.

(57) ABSTRACT

A method implemented in a computer infrastructure having computer executable code having programming instructions tangibly embodied on a computer readable storage medium. The programming instructions are operable to receive an object from an application server and detect that an object encryption is activated for the object. Additionally, the programming instructions are operable to inspect an annotation for the object and determine that the object or one or more attributes of the object require encryption based on the inspecting. Furthermore, the programming instructions are operable to encrypt the object or the one or more attributes of the object that require encryption based on the determining using an encryption type and serialize and cache the object in a cache storage.

22 Claims, 6 Drawing Sheets

(56) References Cited

OTHER PUBLICATIONS

Giereth, Mark, "On Partial Encryption of RDF-Graphs," Lecture Notes in Computer Science, 2005, vol. No. 3729, pp. 308-322.*

Kim et al., "Energy-efficient Java execution using local memory and object co-location", IEE Proc.-Comput. Digit. Tech., vol. 151, No. 1, Jan. 2004, pp. 33-42.

Suh et al., "Secure Program Execution via Dynamic Information Flow Tracking", ASPLOS '04, Oct. 9-13, 2004, pp. 85-96.

Joshi et al., "Detecting Past and Present Intrusions through Vulnerability-Specific Predicates", SOSP '05, Oct. 23-26, 2005, pp. 91-104.

Aldrich et al., "Alias Annotations for Program Understanding", OOPLSA '02, Nov. 4-8, 2002, pp. 311-330.

* cited by examiner

METHOD AND SYSTEM FOR ANNOTATION BASED SECURE CACHING

FIELD OF THE INVENTION

The present invention generally relates to caching, and more particularly, to a method and system for annotation based secure caching.

BACKGROUND

A cache is a collection of data duplicating original values stored elsewhere or computed earlier, where the original data may be expensive to fetch (owing to longer access time) or to compute, compared to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is shorter. A cache, therefore, helps expedite data access that a central processing unit (CPU) would otherwise need to fetch from main memory. Additionally, as is understood by one skilled in the art, a cache may refer to the block of memory for temporary storage of cached data likely to be used again.

A CPU and hard drive, for example, frequently use a cache, as do web browsers and web servers. More specifically, a cache is made up of a pool of entries. Each entry has a datum (a nugget of data) which is a copy of the datum in some data storage. Each entry also has a tag, which specifies the identity of the datum in the backing store of which the entry is a copy.

When a cache client (e.g., a CPU, web browser, or operating system, amongst other cache clients) wishes to access a datum presumably in the backing store, it first checks the cache. If an entry can be found with a tag matching that of the desired datum, the datum in the entry is used instead. This situation is known as a cache hit. So, for example, a web browser program might check its local cache on disk to see if it has a local copy of the contents of a web page at a particular URL. In this example, the URL is the tag, and the content of the web page is the datum.

Often, data stored in a cache may be encrypted. In cryptography, encryption is the process of transforming information (referred to as plaintext) using an algorithm (called cipher) to make it unreadable to anyone except those possessing special knowledge, usually referred to as a key. The result of the process is encrypted information (in cryptography, referred to as ciphertext). In many contexts, the word encryption also implicitly refers to the reverse process, decryption (e.g., "software for encryption" can typically also perform decryption), to make the encrypted information readable again (i.e., to make it unencrypted).

Encryption is used in protecting information within many kinds of systems, such as computers, networks (e.g. the Internet e-commerce), mobile telephones, wireless microphones, wireless intercom systems, Bluetooth devices and bank automatic teller machines. Encryption is also used in digital rights management to prevent unauthorized use or reproduction of copyrighted material and in software also to protect against reverse engineering (see also copy protection).

Object-oriented programming (OOP) is a programming paradigm that uses "objects" and their interactions to design applications and computer programs. Programming techniques may include, for example, features such as encapsulation, modularity, polymorphism, and inheritance. Many modern programming languages now support OOP.

Object-oriented programming may be seen as a collection of cooperating objects, as opposed to a traditional view in which a program may be seen as a group of tasks to compute ("subroutines"). In OOP, each object is capable of receiving messages, processing data, and sending messages to other objects. Moreover, each object may comprise a number of attributes.

Each object can be viewed as an independent machine with a distinct role or responsibility. The actions or "operators" on the objects are closely associated with the object. For example, in OOP, the data structures tend to carry their own operators around with them (or at least "inherit" them from a similar object or "class").

An annotation, in the Java® computer programming language, is a special form of syntactic metadata that can be added to Java source code. (Java and all Java-based trademarks and logos are trademarks of Sun Microsystems, Inc. in the United States, other countries, or both.) For example, attributes, classes, methods, variables, parameters and packages may be annotated. Java annotations are reflective in that they are embedded in class files generated by the compiler and may be retained by the Java virtual machine to be made retrievable at run-time. Moreover, annotations themselves are annotated to indicate where and when they can be used.

WebSphere® dynacache, Memcache, tangasol and other caches often store data unencrypted in memory or encrypt an entire object. (WebSphere is a registered trademark of International Business Machines Corporation in the United States, other countries, or both.) That is, with these approaches, an object may be unencrypted or entirely encrypted (including all of the attributes of the object). Moreover, if an object is entirely encrypted, with current approaches, the entire object is encrypted using the same type of encryption (e.g., hash or RSA). (As should be understood by one skilled in the art RSA is not an acronym per se. Rather, the three letters are the first letters of the last names of the developers of RSA (i.e., Rivest, Shamir and Adleman).) However, these methods do not give control to the developer to determine what can be cached, and what types of encryption can be used on a piece of data. That is, these methods do not allow a developer to encrypt only particular attributes of an object. Moreover, these approaches do not allow a developer to assign different types of encryption to different attributes of the same object.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive an object from an application server and detect whether object encryption is activated for the object. Additionally, the programming instructions are operable to inspect an annotation for the object when the object encryption is activated for the object and determine whether the object or one or more attributes of the object require encryption based on the inspecting. Furthermore, the programming instructions are operable to encrypt the object or the one or more attributes of the object that require encryption based on the determining using an encryption type and serialize and cache the object in a cache storage.

In another aspect of the invention, a system comprises a caching engine operable to receive an object from an application server and detect whether object encryption is activated for the object. Further, the caching engine is operable to inspect an annotation for the object when the object encryption is activated for the object and determine whether the object or one or more attributes of the object require encryption based on the inspecting. Additionally, the caching engine is operable to encrypt the object or the one or more attributes of the object that require encryption based on the determining using an encryption type and serialize and cache the object in a cache storage.

In an additional aspect of the invention, a computer program product comprising a computer usable storage medium having readable program code embodied in the medium is provided. The computer program product includes at least one component operable to receive an object from an application server and detect whether object encryption is activated for the object. Additionally, the at least one component is operable to inspect an annotation for the object when the object encryption is activated for the object and determine whether the object or one or more attributes of the object require encryption based on the inspecting. Further, the at least one component is operable to encrypt the object or the one or more attributes of the object that require encryption based on the determining using an encryption type and serialize and cache the object. Additionally, the annotation is a runtime annotation and the annotation indicates one or more encryption types supported for the object or the one or more attributes of the object.

In a further aspect of the invention, a method comprises providing a computer infrastructure operable to receive an object from an application server and detect whether object encryption is activated for the object. Additionally, the computer infrastructure is operable to inspect an annotation for the object when the object encryption is activated for the object and determine whether the object or one or more attributes of the object require encryption based on the inspecting. Further, the computer infrastructure is operable to encrypt the object or the one or more attributes of the object that require encryption based on the determining using an encryption type and serialize and cache the object. Further, when determining that the object encryption is not activated for the object based on the detecting, the serializing and caching the object is performed without encryption of the object, and when determining that at least one of the object and all of the one or more attributes of the object do not require encryption based on the inspecting, the serializing and caching the object is performed without encryption of the object.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
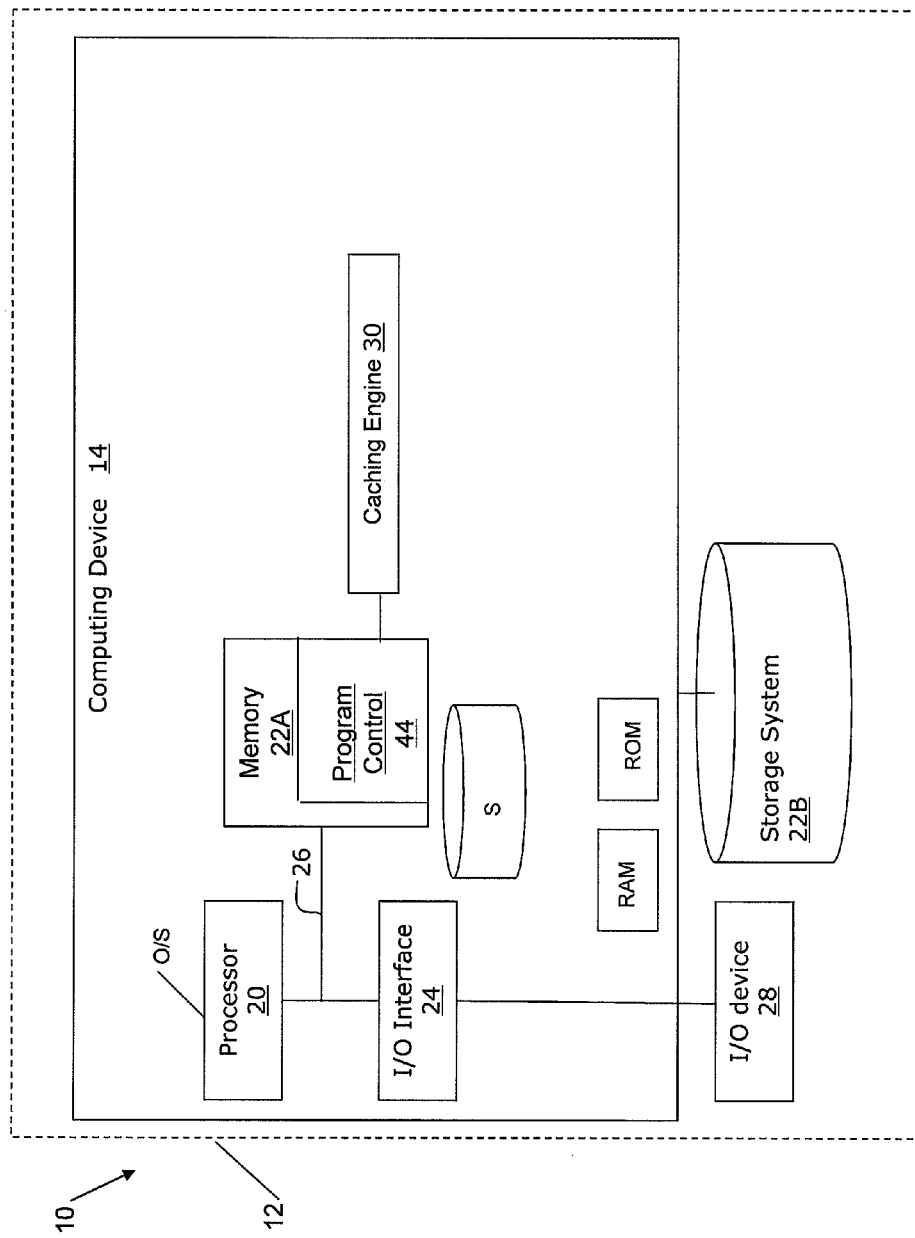
FIG. 1 shows an illustrative environment for implementing the steps in accordance with the invention.

The present invention generally relates to caching, and more particularly, to a method and system for annotation based secure caching. More specifically, the present invention provides a method and system for a caching engine to encrypt specific attributes of an object on the fly (e.g., in real time) by inspecting annotations associated with the attribute. The present invention abstracts the encryption away from the application and allows developers to set caching level via the annotations that describe how to encrypt an attribute of an object.

Implementing the present invention gives control to, e.g., a developer to determine what data (e.g., objects or particular attributes of an object) is to be cached, and what types of encryption are used to encrypt the data (e.g., each of the objects and/or particular attributes of each of the objects). For example, the present invention allows for objects and/or particular attributes of an object to be cached unencrypted, hashed or strongly encrypted (e.g., using RSA encryption) on the fly by determining the annotation of each attribute.

Furthermore, implementing the present invention allows the caching engine to switch caching mechanisms for a particular object (or particular attributes of an object) on the fly. For example, if a cache needs to be debugged, utilizing the present invention, the security level of the cache can be changed on the fly (e.g., in real time) while the system is running and the newly cached contents can be switched to, e.g., clear text. If there are efficiency problems with an encryption mechanism for a particular attribute of an object, for example, using the present invention, the encrypting mechanism can be changed to any encrypting mechanism supported in the annotation. Additionally, if encryption is not available and the attribute does not have "nocrypt" as an option the attribute will not be cached. This helps to ensure that an attribute remains secure.

Moreover, by implementing the present invention using the annotations to set caching levels allows multiple servers to share the same cache in a secure fashion. For example, by allowing the caching engine to encrypt the data with a private key, the present invention allows servers to retrieve cached data and decrypt annotated data if they did not place it in the system if they have the public key.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a caching engine 30. The caching engine 30 is operable to receive objects from an application for caching, check annotations of the object to determine whether encryption is required for the object (or any attributes of the object), encrypt those objects (or attributes of the object) that require encryption, serialize and cache the object, receive requests from an application for objects from a cache, decrypt the object (or attributes of the object) as directed by the annotations, and send the object to the application server, e.g., the processes described herein.

The caching engine 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard, etc.

In general, the processor 20 executes the computer program code (e.g., program control 44), which can be stored in the memory 22A and/or storage system 22B. Moreover, in accordance with aspects of the invention, the program control 44 having program code controls the caching engine 30. While executing the computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure (or server) 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 (e.g., an application server, described further below, which may request objects from the caching engine 30 of the server 12 and, in embodiments, may decrypt objects using a decryption component) using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Cryptographic Hash Cache

Figure 2:
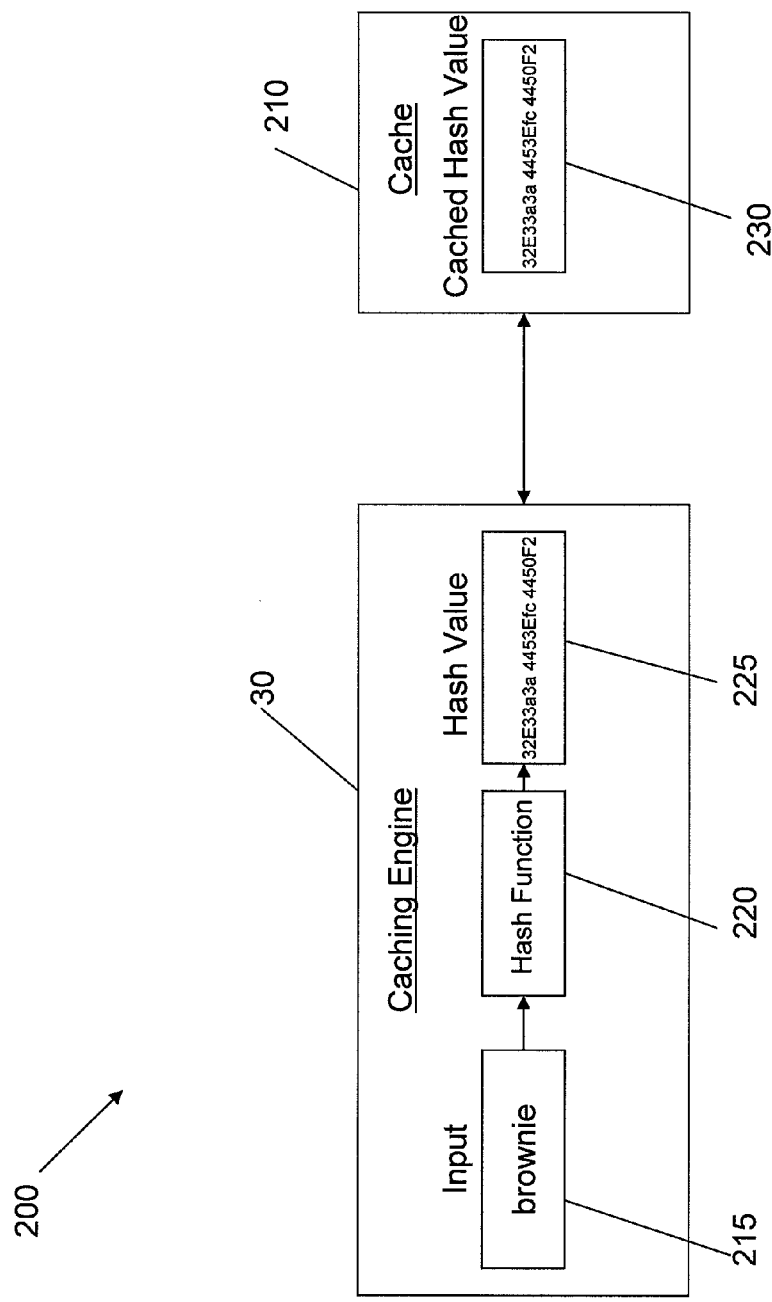
FIG. 2 shows an exemplary cryptographic hash cache process in accordance with aspects of the invention.

FIG. 2 shows an exemplary cryptographic hash cache process 200 in accordance with aspects of the invention. The caching engine 30 takes an input object 215 (e.g., the term "brownie") and, via a hash function 220, returns a fixed sized string called a hash value 225 (e.g., "32E33a3a 4453Efc 4450F2"). The cryptographic hash caching engine 30 places the hash value 225 in the cache 210 instead of the actual input object 215 to create a cached hash value 230. In embodiments, the cache 210 may be stored in the storage system 22B of FIG. 1.

This cryptographic hash technique may be useful, for example, when the value being cached is not being displayed, but rather, is being compared against for verification. The hash function 220 creates a "digital fingerprint" of the data being verified. Thus, instead of performing a comparison of the input object 215 (e.g., the term "brownie"), which may be, for example, sensitive or privileged information, a comparison can be made with the hash value 225, which is the "digital fingerprint" of the data being verified.

For example, a credit card number may be cached, for example, in memory or on a storage disk. Normally, this cache may be unencrypted, thus making it easy for a hacker to poke through the memory of the computer or check the disk offload for a clear text credit card. However, since the system may only be verifying the credit card data that is in cache and comparing to what the user entered, it is more secure to apply a hashing function to the user input and compare the hash value of the user's input to the hash stored in cache. That is, if the cache 210 is compromised, the cached hash values 230 are useless to the hacker without the hash function 220.

Two suitable algorithms for hashing include, for example, MD5 (Message-Digest algorithm 5) and SHA-1 (Secure Hash Algorithm-1), amongst other hashing algorithms. In cryptography, MD5 is a widely used cryptographic hash function with a 128-bit hash value. As an Internet standard, MD5 has been employed in a wide variety of security applications, and is also commonly used to check the integrity of files. An MD5 hash may typically be expressed as a thirty two digit hexadecimal number. Additionally, the SHA hash functions are a set of cryptographic hash functions. In particular, SHA-1 produces a message digest that is one hundred sixty bits long. Other SHAs (e.g., SHA-2, SHA-3, etc.) produce message digests of different lengths of bits.

Cryptographic RSA Cache

Figure 3:
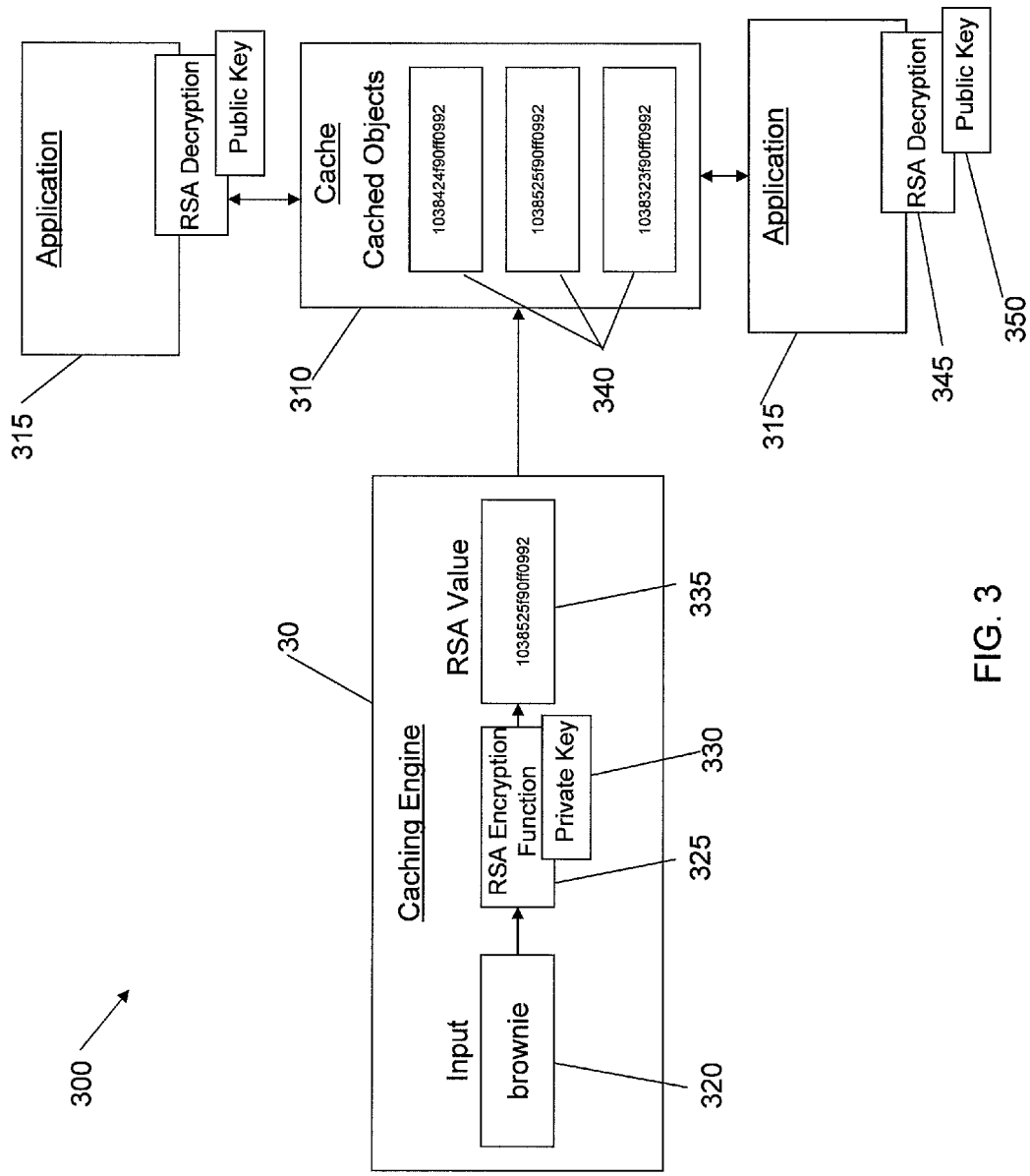
FIG. 3 shows an exemplary cryptographic RSA cache process in accordance with aspects of the invention.

FIG. 3 shows an exemplary cryptographic RSA cache process 300 in accordance with aspects of the invention. In cryptography, RSA is an algorithm for public-key cryptography. RSA is widely used in electronic commerce protocols.

Public-key cryptography, also known as asymmetric cryptography, is a form of cryptography in which the key used to encrypt a message differs from the key used to decrypt the message. In public key cryptography, a user has a pair of cryptographic keys: a public key and a private key. The private key is kept secret, while the public key may be widely distributed. Incoming messages would have been encrypted with the recipient's public key and can only be decrypted with his corresponding private key. The keys are related mathematically, but the private key cannot be practically derived from the public key.

With RSA caching, the caching engine 30 is operable to receive an input object 320 (e.g., the term "brownie") and using an RSA encryption function 325 with a private key 330, create an encrypted RSA value 335 (e.g., "1038525f90ff0992"). Additionally, the caching engine 30 is operable to place the RSA value 335 in a cache 310 as a cached object 340. If the cache 310 needs to be replicated to another cache (not shown), the other cache has the ability to read the cache 310 and decrypt one or more of the cached objects 340 using a public key 350. In embodiments, the cache 310 may be stored in the storage system 22B of FIG. 1.

Also, as shown in FIG. 3, each application 315, e.g., server, that subscribes to the cache 310 may decrypt one or more of the cached objects 340 using an RSA decryption 345 with a public key 350. In addition, in embodiments, each application 315, e.g., server, may have a different public/private key relationship with the cache 310. This allows multiple applications 315, e.g., servers, to place data in the cache 310 while maintaining the security of the application. For example, one application, by virtue of its public/private key relationship with the cache 310, may be able to access only particular cached objects (e.g., some subset of cached objects 340) from the cache 310, and another application, by virtue of its public/private key relationship with the cache 310, may be able to access only particular cached objects (e.g., some different subset of cached objects 340) from the cache 310. Moreover, if an application 315, e.g., server, is cloned, the cloned server needs the public key 350 to access the data in the cache 310 allowing both clones to place data in the cache 310 and access that data.

Annotation Based Control of Caching

In accordance with aspects of the invention, Java runtime annotations may be used to turn on, e.g., hash caching, RSA caching, or other caching mechanisms for an object or particular attributes of an object. As should be understood by one skilled in the art, a runtime annotation is an annotation that can be inspected during runtime.

For example, a Java annotation may include the following code: import java.lang.annotation.*;

```
@Retention(RetentionPolicy.RUNTIME)
@interface CacheType {String[ ] value( );}
```

With this above exemplary annotation, a runtime annotation has been created that contains a string array of value.

Additionally, for an exemplary class of credit card, the Java annotation may include the following code:

```
@CacheType("None")
public class CreditCard
@CacheType("Hash","RSA")
Integer ccnum;
public void setCardNumber(Int ccnum)
Public boolean getCardNumber(Int ccnum)
```

In accordance with aspects of the invention, the "@cacheType" is used to instruct the caching engine 30 and cache as to what type of encryption is supported. Thus, in the example above, the ccnum (which represents the credit card number) can support hash and RSA caching. More specifically, with the above example, the annotation "@CacheType("None")" public class CreditCard" indicates to the caching engine 30 that the class of credit card (i.e., the object) is not encrypted as a whole. However, as indicated by the annotation "@CacheType("Hash","RSA") Integer ccnum," hash and RSA encryption are supported for the credit card number, which is a particular attribute of the class of credit card (e.g., the object). Thus, the annotations of the present invention allow for selective encryption of particular attributes of an object, so that the entire object need not be encrypted, which would, for example, require more overhead resources.

When the caching engine 30 puts an item in cache, the caching engine 30 checks the caching specification in the annotation for how to cache an attribute (or an entire object). As should be understood by one of skill in the art, a developer can change the caching strategy in runtime because the caching engine 30 looks at the encryption methods supported for each attribute when it pushes and pulls data from the cache. When the caching mechanism is changed (e.g., from hash to RSA), the cache should discard all objects that the encryption has been changed for. In effect, the function is overloaded by placing special business logic for caching. Since encrypting creates overhead, as described above, instead of encrypting an entire object, with the present invention, annotations allow the developer to determine what attributes of the object (which, in embodiments, may be all of the attributes or the entire object) need the ability to be encrypted.

Flow Diagrams

Figure 4:
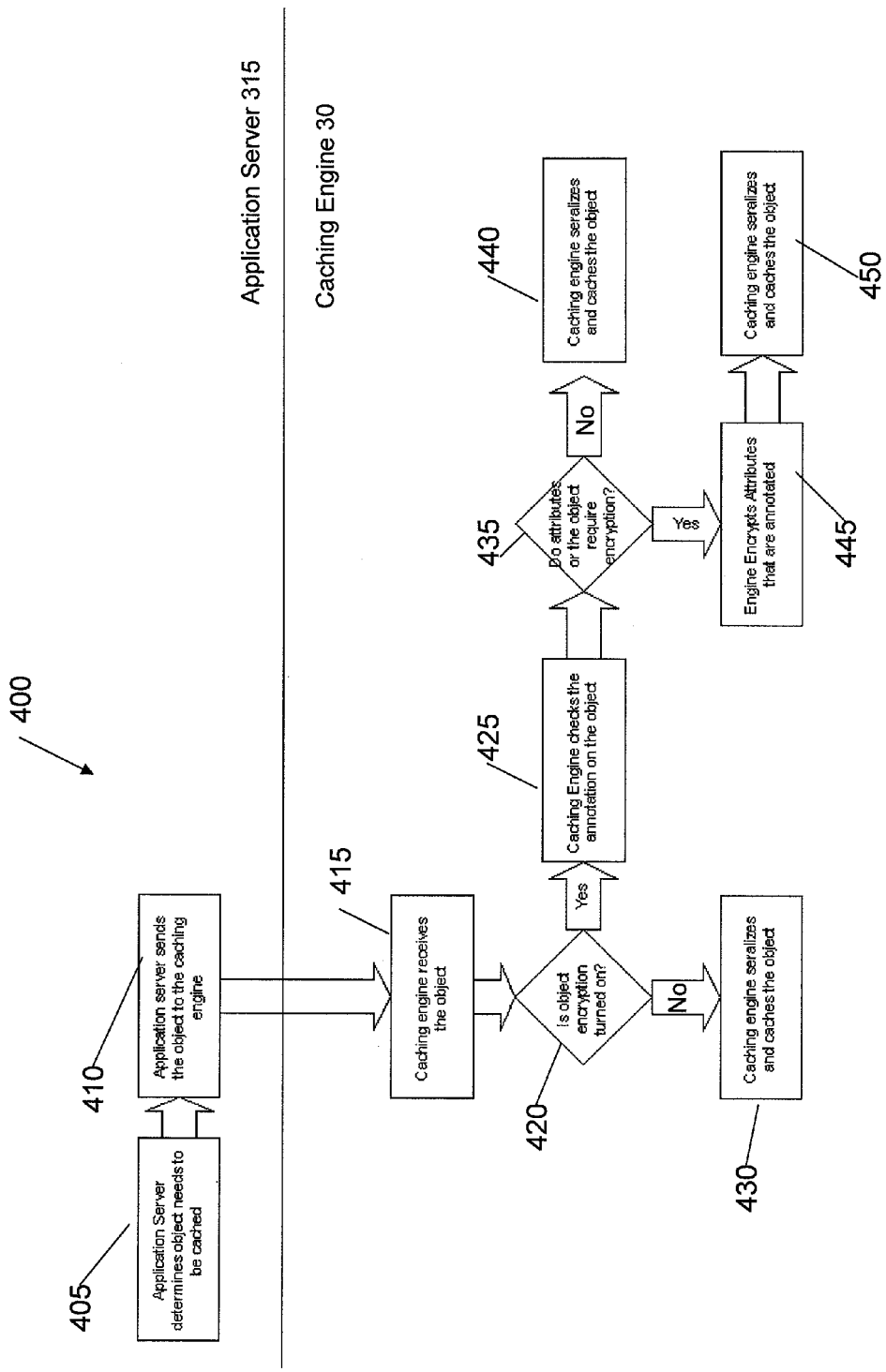
FIG. 4 shows an exemplary process flow for caching in accordance with aspects of the invention.
Figure 5:
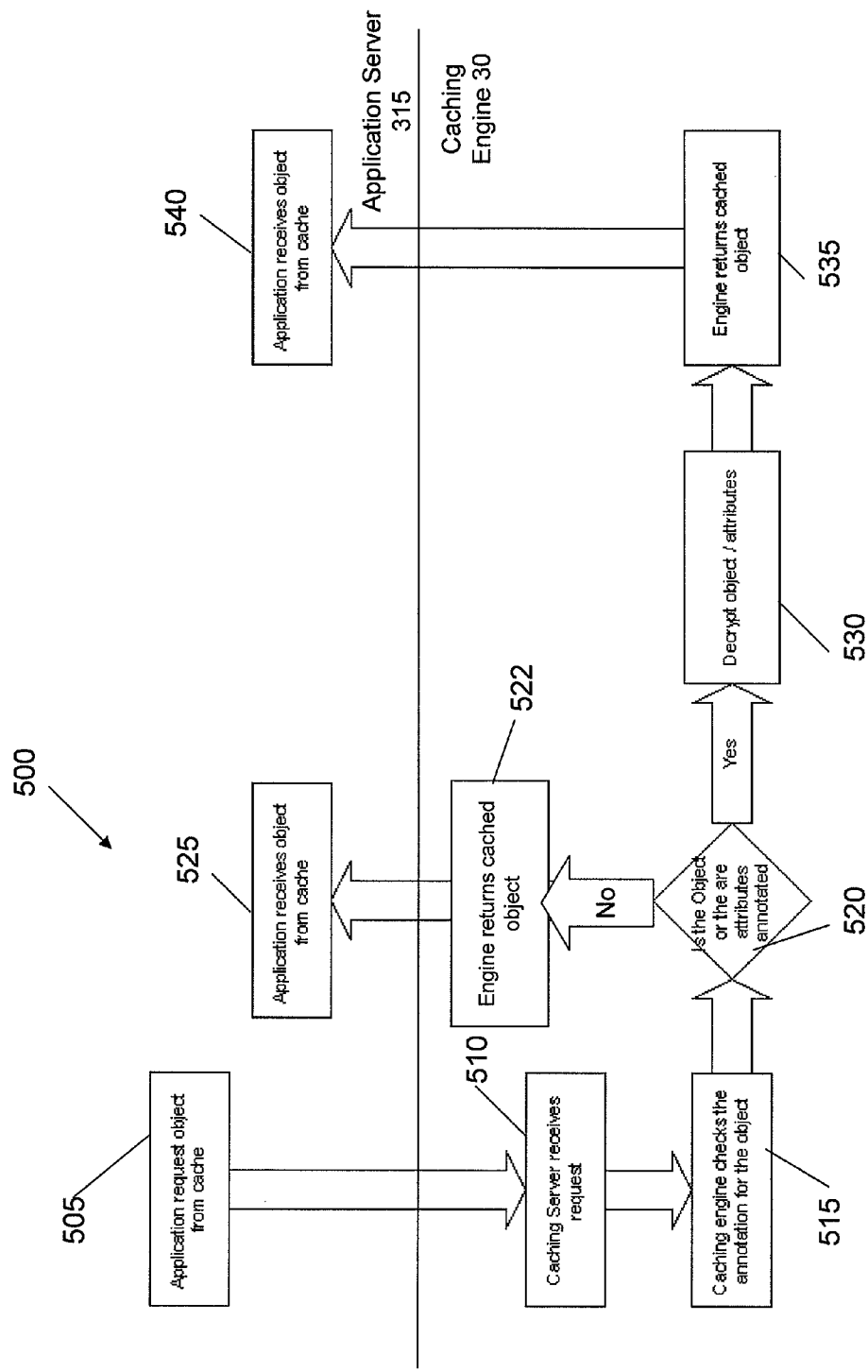
FIG. 5 shows an exemplary process flow for a hash cache retrieval in accordance with aspects of the invention.
Figure 6:
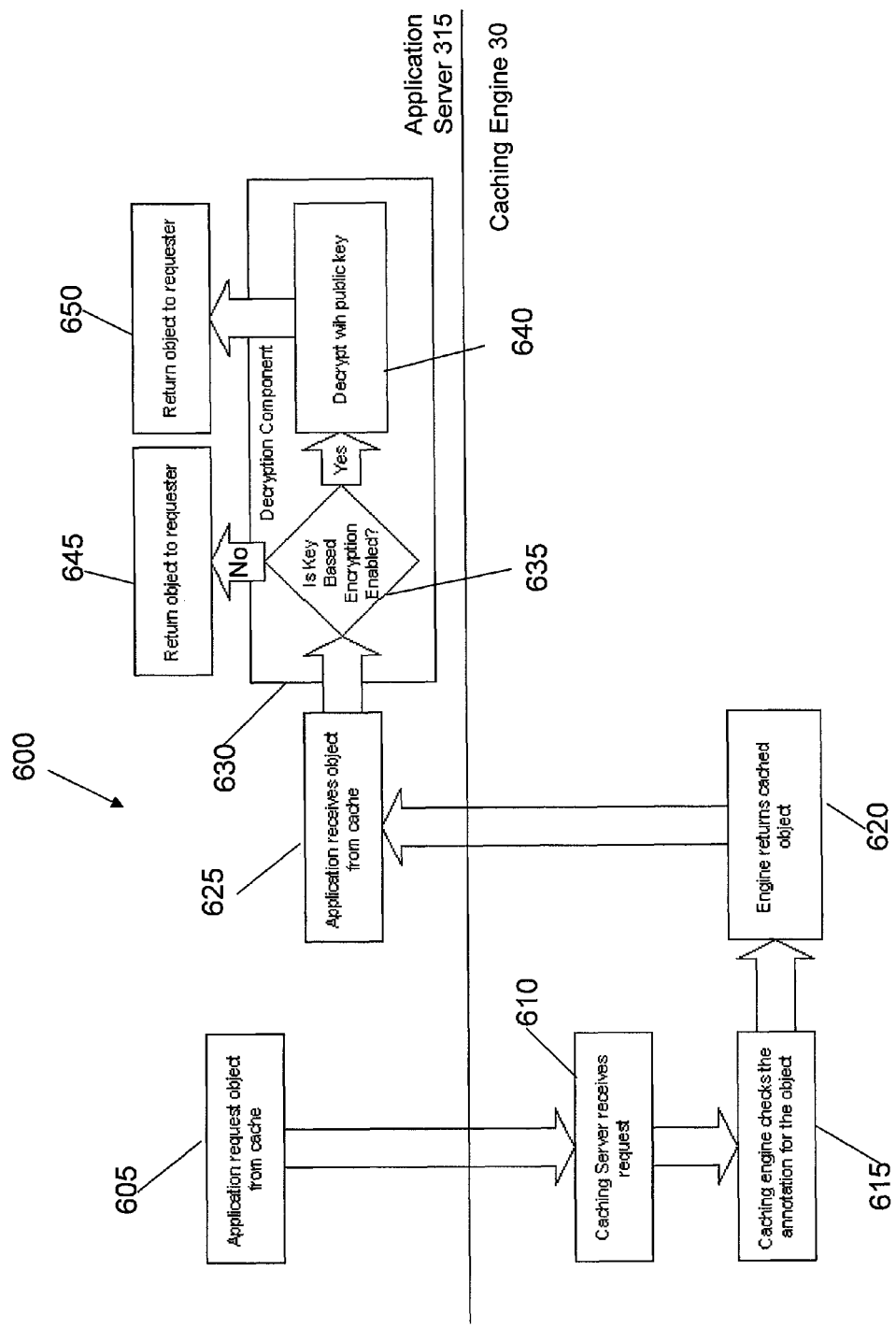
FIG. 6 shows an exemplary process flow for an RSA/key-based cache retrieval in accordance with aspects of the invention.

FIGS. 4-6 show exemplary flows for performing aspects of the present invention. The steps of FIGS. 4-6 may be implemented in the environment of FIG. 1, for example. The flow diagrams may equally represent high-level block diagrams of the invention. The flowcharts and/or block diagram in FIGS. 4-6 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 shows an exemplary process flow 400 for caching in accordance with aspects of the invention. More specifically, the exemplary process flow 400 involves communications between an application server 315 and the caching engine 30 as indicated by the horizontal line. As shown in FIG. 4, at step 405, an application server determines an object requires caching. At step 410, the application server sends the object to the caching engine. At step 415, the caching engine receives the object. At step 420, the caching engine determines whether encryption for the object is turned on. If, at step 420, the caching engine determines that encryption for the object is not turned on, then, at step 430, the caching engine serializes and caches the object. If, at step 420, the caching engine determines that encryption for the object is turned on, then, at step 425, the caching engine checks the annotation of the object.

At step 435, the caching engine determines whether attributes of the object (or the entire object) indicate required encryption. If, at step 435, the caching engine determines that attributes of the object (or the entire object) do not indicate any required encryption, then, at step 440, the caching engine serializes and caches the object. If, at step 435, the caching engine determines that attributes of the object (or the entire object) do indicate required encryption, then, at step 445, the caching engine encrypts those attributes that are annotated (or encrypts the entire object if indicated by the annotation). At step 450, the caching engine serializes and caches the object.

FIG. 5 shows an exemplary process flow 500 for a hash cache retrieval in accordance with aspects of the invention. More specifically, the exemplary process flow 500 involves communications between the application server 315 and the caching engine 30 as indicated by the horizontal line. At step 505, an application requests an object from a cache. At step 510, a caching server (e.g., the computing infrastructure 12 or server of FIG. 1) receives the request. At step 515, the caching engine checks the annotation for the object. At step 520, the caching engine determines if the object is annotated or if attributes of the object are annotated indicating some encryption of the object or attributes of the object.

If, at step 520, the caching engine determines that the object is not annotated and attributes of the object are not annotated, then, at step 522, the caching engine returns the cached object, and at step 525, the application receives the object from the cache. If, at step 520, the caching engine determines that either the object is annotated or attributes of the object are annotated, then, at step 530, the caching engine decrypts the object or the attributes. At step 535, the caching engine returns the cached object. At step 540, the application receives the object from the cache.

FIG. 6 shows an exemplary process flow 600 for an RSA/key-based cache retrieval in accordance with aspects of the invention. More specifically, the exemplary process flow 600 involves communications between the application server 315 and the caching engine 30 as indicated by the horizontal line. At step 605, an application requests an object from a cache. At step 610, the caching server (e.g., the computing infrastructure 12 or server of FIG. 1) receives the request. At step 615, the caching engine checks the annotation for the object. At step 620, the caching engine returns the cached object. At step 625, the application server receives the object from the cache.

At step 635, a decryption component 630 of the application server determines whether a key-based encryption is enabled. If, at step 635, the decryption component determines that the key-based encryption is not enabled, at step 645, the decryption component returns the object to the requestor. If, at step 635, the decryption component determines that the key-based encryption is enabled, at step 640, the decryption component decrypts the object (or attributes) with a public key. At step 650, the decryption component returns the object to the requestor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure and comprising:
   receiving an object requiring caching from an application server;
   detecting that an object encryption is activated for the object;
   inspecting an annotation for an attribute of the object, which indicates a type of encryption supported for the attribute;
   determining that the attribute of the object requires encryption using a first type of encryption based on the inspecting;
   encrypting the attribute of the object that requires encryption using the first type of encryption;
   serializing and caching the object and the attribute encrypted with the first type of encryption in a cache storage;
   changing the first type of encryption to a second type of encryption as indicated by the annotation;
   discarding the object and the attribute encrypted with the first type of encryption from the cache storage upon changing the first type of encryption to the second type of encryption;
   encrypting the attribute of the object that requires encryption using the second type of encryption; and
   serializing and caching the object and the attribute encrypted with the second type of encryption in the cache storage,
   wherein the computer infrastructure comprises a computing device including a caching engine that performs at least the receiving, the detecting, the inspecting, the determining, the encrypting, and the serializing and caching.

2. The method of claim 1, wherein when determining that the object encryption is not activated for the object based on the detecting, the serializing and caching the object is performed without encryption of the object.

3. The method of claim 1, wherein when determining that the attribute of the object does not require encryption based on the inspecting, the serializing and caching the object and the attribute is performed without encryption of the object.

4. The method of claim 1, further comprising:
   the caching engine receiving a request from a server for the object from the cache storage;
   the caching engine determining that the annotation for the attribute of the object indicates that the attribute of the object is encrypted using the type of encryption supported for the attribute;
   the caching engine decrypting the attribute of the object which is encrypted; and
   the caching engine sending the object to the server.

5. The method of claim 4, wherein the server is one of the application server and another application server.

6. The method of claim 1, further comprising
   the caching engine receiving a request from a server for the object from the cache storage;
   the caching engine determining that the annotation for the attribute of the object indicates that the attribute of the object is encrypted using the type of encryption supported for the attribute;
   the caching engine sending the object and the attribute to the server, wherein the server is operable to one of:
      return the object and the attribute to a requestor when a key-based encryption is not enabled; and
      return the attribute of the object and the object to the requester after decrypting the attribute of the object using a public key when the key-based encryption is enabled.

7. The method of claim 6, wherein the server is one of the application server and another application server.

8. The method of claim 1, wherein the first type of encryption comprises one of a hash encryption and an RSA encryption and the second type of encryption comprises one of the RSA encryption and the hash encryption, respectively.

9. The method of claim 1, wherein the annotation is a runtime annotation.

10. The method of claim 1, wherein the annotation indicates at least two encryption types supported for the attribute of the object.

11. The method of claim 1, wherein the inspecting occurs upon pushing or pulling data from the cache storage.

12. The method of claim 1, further comprising discarding the object from the cache storage when an encryption type of the object is changed.

13. The method of claim 1, wherein the first type of encryption comprises at least one of a hash encryption and an RSA encryption.

14. The method of claim 1, wherein a service provider at least one of creates, maintains, deploys and supports the computer infrastructure.

15. The method of claim 1, wherein steps are provided by a service provider on a subscription, advertising, and/or fee basis.

16. A system, comprising:
a hardware computing device including a caching engine operable to:
receive an object requiring caching from an application server;
detect that an object encryption is activated for the object;
inspect an annotation for an attribute of the object, which indicates a type of encryption supported for the attribute;
determine whether the attribute of the object requires encryption using a first type of encryption based on the inspecting;
encrypt the attribute of the object that requires encryption using the first type of encryption;
serialize and cache the object and the attribute encrypted with the first type of encryption in a cache storage;
change the first type of encryption to a second type of encryption as indicated by the annotation;
discard the object and the attribute encrypted with the first type of encryption from the cache storage upon changing the first type of encryption to the second type of encryption;
encrypt the attribute of the object that requires encryption using the second type of encryption; and
serialize and cache the object and the attribute encrypted with the second type of encryption in the cache storage.

17. The system of claim 16, wherein the caching engine is further operable to:
receive a request from a server for the object from the cache storage;
determine that the annotation for the attribute of the object indicates that the attribute of the object is encrypted using the type of encryption supported for the attribute;
decrypt the attribute of the object which is encrypted; and
send the object to the server.

18. The system of claim 17, wherein the server is one of the application server and another application server.

19. The system of claim 16, wherein the caching engine is further operable to:
receive a request from a server for the object from the cache storage;
determine that the annotation for the attribute of the object indicates that the attribute of the object is encrypted using the type of encryption supported for the attribute; and
send the object and the attribute to the server, such that the server is operable to one of:
return the object and the attribute to a requester when a key-based encryption is not enabled; and
return the attribute of the object and the object to the requestor after decrypting the attribute of the object using a public key when the key-based encryption is enabled.

20. The system of claim 19, wherein the server is one of the application server and another application server.

21. A computer program product comprising a computer readable hardware storage device having readable program code stored on the computer readable storage device, the program code comprising:
program code to receive an object requiring caching from an application server;
program code to detect whether object encryption is activated for the object;
program code to inspect an annotation for an attribute of the object, which indicates a type of encryption supported for the attribute, when the object encryption is activated for the object;
program code to determine whether the attribute of the object requires encryption using a first type of encryption based on the inspecting;
program code to encrypt the attribute of the object that requires encryption using the first type of encryption;
program code to serialize and cache the object and the attribute encrypted with the first type of encryption;
program code to change the first type of encryption to a second type of encryption as indicated by the annotation;
program code to discard the object and the attribute encrypted with the first type of encryption upon changing the first type of encryption to the second type of encryption;
program code to encrypt the attribute of the object that requires encryption using the second type of encryption;
program code to serialize and cache the object and the attribute encrypted with the second type of encryption; and
program code to perform at least the receiving, the detecting, the inspecting, the determining, the encrypting, and the serializing and caching,
wherein the annotation is a runtime annotation, and
wherein the annotation indicates at least two encryption types supported for the attribute of the object.

22. A method comprising:
providing a computer infrastructure operable to:
receive an object from an application server;
detect whether object encryption is activated for the object;
inspect an annotation for an attribute of the object, which indicates a type of encryption supported for the attribute, when the object encryption is activated for the object;
determine whether the attribute of the object requires encryption using a first type of encryption based on the inspecting;
encrypt the attribute of the object that requires encryption using the first type of encryption;
serialize and cache the object and the attribute encrypted with the first type of encryption;
change the first type of encryption to a second type of encryption as indicated by the annotation;
discard the object and the attribute encrypted with the first type of encryption upon changing the first type of encryption to the second type of encryption;
encrypt the attribute of the object that requires encryption using the second type of encryption; and
serialize and cache the object and the attribute encrypted with the second type of encryption,
wherein when determining that the object encryption is not activated for the object based on the detecting, the serializing and caching the object is performed without encryption of the object, and wherein when determining that the attribute of the object does not require encryption based on the inspecting, the serializing and caching the object and the attribute is performed without encryption of the object.

* * * * *